Aug. 8, 1933.    H. D. CHURCH    1,921,562
SPRING CONNECTION FOR VEHICLES
Filed Feb. 26, 1932
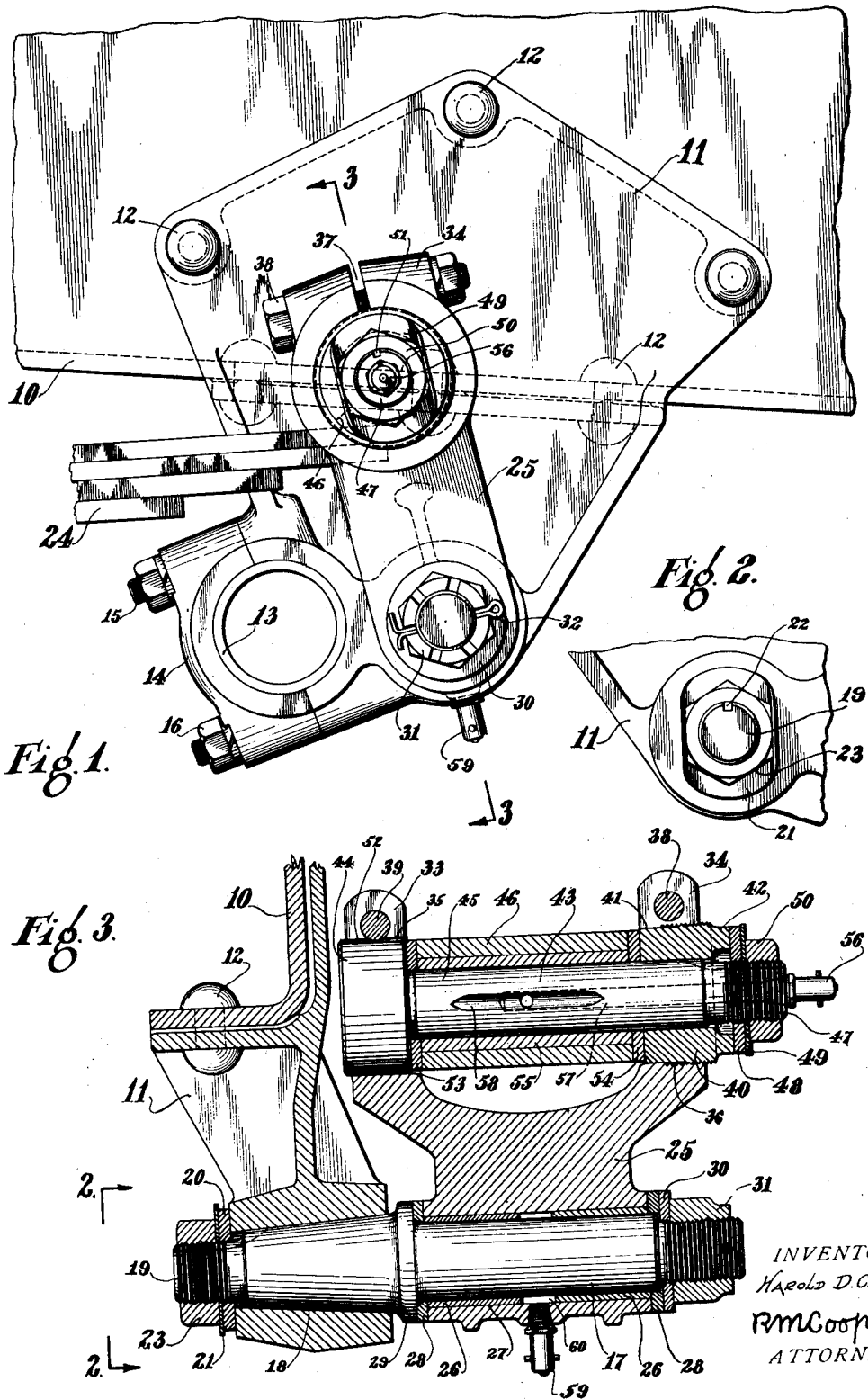
INVENTOR
Harold D. Church.
R M Cooper
ATTORNEY Patented Aug. 8, 1933

1,921,562

UNITED STATES PATENT OFFICE 1,921,562

SPRING CONNECTION FOR VEHICLES

Harold D. Church, Cleveland, Ohio, assignor to The White Motor Company, Cleveland, Ohio, a Corporation of Ohio Application February 26, 1932. Serial No. 595,299

5 Claims. (Cl. 267—54)

This invention relates to spring connections for vehicles.

It is an object of this invention to provide a spring connection which comprises positive and reliable means for compensating for side wear.

It is a further object of this invention to provide a connection which permits the spring to be mounted closely adjacent a relatively movable part of the vehicle.

It is a further object of this invention to provide a connection of durable construction which is both economic of manufacture and maintenance.

Other objects and attendant advantages will appear in the following description of one practical embodiment of my invention illustrated in the accompanying drawing, in which:

Figure 1 is a side elevation of a spring connection.

Figure 2 is a side view of the lower portion of the connection shown in Figure 1 viewed from the opposite direction, and Figure 3 is a section taken on line 3—3 of Figure 1.

Referring to the drawing, the numeral 10 indicates the side frame rail of an automobile, and the numeral 11 a supporting bracket secured to the side rail 10 by means of rivets 12.

Connecting the bracket 11 with a corresponding bracket mounted on the frame side rail at the opposite side of the vehicle, there is a tie rod 13, the opposite ends of which are clamped between the brackets proper and caps 14 secured to the bracket by means of studs 15 and nuts 16.

Mounted in the lower depending portion of the bracket 11, there is a pin 17 formed with a conical portion 18 which fits within a conical aperture formed in the bracket, and with a threaded end portion 19 which extends beyond the bracket. Mounted upon the threaded end portion 19, there is an ordinary washer 20, a lock washer 21 formed with a projection 22 which extends into a groove in the pin, and a nut 23. In the assembly, the washer 20 is placed upon the threaded end of the pin 17 followed by the lock washer 21 which is then in the form of a flat disc. The nut 23 is then screwed onto the end portion 19 drawing the tapered surface of the pin into tight frictional engagement with the tapered surface of the aperture in the bracket, and the sides of the washer bent up to lock the nut in place.

Extending between the pin 17 and the end of an adjacent spring 24, there is a shackle member 25. This member is journalled upon the outwardly extending portion of the pin 17 by means of a pair of bearing bushings 26 set in a bore 27 formed in its lower end, and is mounted upon the pin between thrust washers 28. It is held against lateral movement in one direction by a shoulder 29 formed on the pin adjacent the bracket 11, and in the opposite direction by a washer 30 and a nut 31 mounted on the outer threaded end of the pin, the latter part being locked against rotation by a cotter key 32.

The upper part of the shackle comprises an arm 33 separated from the frame side rail 10 by a small clearance space, and an arm 34 spaced outwardly from the arm 33. The arms 33 and 34 are formed with aligned apertures 35 and 36 adjacent their ends, and with slots 37 extending through their terminating end portions into the apertures 35 and 36. Mounted in, and extending between the slot-separated portions of the arm 34, there is a bolt 38, the alternate tightening and loosening of which effects contraction and expansion of the aperture 36, and mounted in the slot-separated portions of the arm 33 there is a similar clamping bolt 39 which extends into the aperture 35 for a short distance.

The bore 36 in the arm 34 is threaded for a portion of its length and receives a threaded bushing 40 which is clamped in position by the bolt 38. The bushing 40 is formed with an unthreaded portion 41 which bears against the unthreaded portion of the bore 36 and relieves the threads from deleterious stresses, and is further formed with an outwardly protruding portion 42 by which it is turned into place.

The spring 24 extends between the arms 33 and 34, and is connected thereto by a pin 43 comprising a head 44 supported in the aperture 35 of the arm 33, and a reduced cylindrical portion 45 which extends through the eye 46 of the spring and the bore of the bushing 40 terminating in a threaded portion 47. The pin 43 is clamped in position by the bolt 39, and is further held in position by a conventional thrust washer 48, a lock washer 49, and a nut 50, the lock washer 49 being constructed with a projection 51 which extends into a groove in the pin, and being bent about the nut 50 to lock it against rotation. The head of the pin 43 is of such a length as not to interfere with movement of the shackle 25 relative to the side rail 10, and is formed with a flat surface 52 which allows its insertion past the bolt 38 and which engages with such part to prohibit rotation of the pin. A washer 53 is introduced between the head of the pin 43 and the adjacent end of the eye 46, and a similar washer 54 is introduced between the bushing 40 and the other end of the eye. The eye itself is provided with a rigidly associated bushing 55.

The pin 43 and the relatively movable parts of the connection associated therewith are supplied with lubricant through a fitting 56 mounted in the end of the pin, a series of ducts 57 formed within the pin, and a groove 58 formed in the side of the pin. The pin 17 and the associated relatively movable parts of the connection are supplied with lubricant through a fitting 59 mounted in the lower end of the shackle, and communicating with an annular reservoir 60 formed by the inner surface of the bore 27 and the ends of the bushings 26.

To adjust for side wear, the bolts 38 and 39 are loosened, the washer 49 bent flat and the nut 50 loosened. The cotter key 32 is then withdrawn, and the nut 31 moved to an adjusted position followed by reinsertion of the cotter key. After adjustment of the nut 31, the bushing 40 is turned to an adjusted position and the bolt 38 tightened. The nut 50 is then turned to advance the pin 43 to an adjusted position, the washer 49 bent up to lock the nut against rotation, and the bolt 39 tightened. It will, of course, be understood that one or more of the above described adjustments of parts may be omitted under certain conditions of wear.

Although the foregoing description is necessarily of a detailed character, in order that the invention may be completely set forth, it is to be understood that specific terminology is not intended to be restrictive or confining, and various rearrangement of parts and modifications of structural details may be resorted to without departing from the spirit or scope of the invention.

I claim as my invention:

1. In a mechanism for connecting one end of a spring to a frame of a vehicle comprising an eye on said spring, a shackle pivotally attached to said frame and comprising a pair of rigidly connected arms which straddle the aforesaid eye of said spring, a bushing adjustably carried in one of said arms, the other of said arms being formed with an aperture, an axially adjustable pin connecting said shackle with said spring, said pin comprising a head mounted in the aperture formed in said last mentioned arm, and a reduced portion extending through the aforesaid eye on said spring and through said bushing, said pin being formed with a shoulder at the junction of the aforesaid head and reduced portion designed to receive the thrust of said spring in one direction, and said bushing being so constructed and mounted as to receive the thrust of said spring in the opposite direction, and means for limiting movement of said pin in a direction to withdraw its end through said bushing adjustably mounted on the portion of said pin which extends through said bushing.

2. In a mechanism for connecting one end of a spring to a frame of a vehicle comprising an eye on said spring, a shackle pivotally attached to said frame and comprising a pair of rigidly connected arms which straddle the aforesaid eye of said spring, a bushing adjustably carried in one of said arms, the other of said arms being formed with an aperture, an axially adjustable pin connecting said shackle with said spring, said pin comprising a head mounted in the aperture formed in said last mentioned arm, and a reduced cylindrical portion extending through the aforesaid eye on said spring and through said bushing, said pin being formed with a shoulder at the junction of the aforesaid head and cylindrical portion designed to receive the thrust of said spring in one direction, and said bushing being so constructed and mounted as to receive the thrust of said spring in the opposite direction, means for holding said pin against movement in a direction to withdraw its end through said bushing, adjustably mounted on the portion of said pin which extends through said bushing, and means for clamping said pin within the aforesaid aperture in said arm.

3. In a mechanism for connecting one end of a spring to a frame member of a vehicle comprising a shackle mounted at the side of said frame member and journalled at one end upon a member supported by said frame member, said shackle comprising an arm extending closely adjacent said frame member and a second arm spaced outwardly from said first named arm, said first named arm being formed with a smooth cylindrical aperture and said second named arm being formed with a threaded cylindrical aperture in alignment with the aperture in said first named arm, a threaded bushing screwed into the aperture in said second named arm, an eye on said spring disposed intermediate the aforesaid arms, an axially adjustable pin connecting said shackle to said spring, said pin comprising a cylindrical head mounted in the aperture formed in said first named arm, and a reduced cylindrical portion extending through the aforesaid eye on said spring and through said bushing, said pin being formed with a shoulder at the junction of the aforesaid head and cylindrical portion designed to receive the thrust of said spring in one direction, and said bushing being so mounted and constructed as to receive the thrust of said spring in the opposite direction, means for holding said pin against movement in a direction to withdraw its end through said bushing adjustably mounted on the portion of said pin which extends through said bushing, and means for clamping the aforesaid head of said pin within the aperture in said first named arm.

4. In a mechanism for connecting one end of a spring to a frame member of a vehicle comprising a shackle mounted at the side of said frame member and journalled at one end upon a member supported upon said frame member, said shackle comprising an arm extending closely adjacent said frame member and a second member spaced outwardly from said first named member, said arms having split apertured ends, the aperture in said first named arm being in the form of a smooth bore and the aperture in said second named arm being in the form of a threaded bore, a threaded bushing screwed into the aperture formed in said second named arm, an eye on said spring disposed intermediate the aforesaid arms, an axially adjustable pin connecting said shackle to said spring, said pin comprising a head mounted in the aperture in said first named arm, a reduced cylindrical portion extending through the aforesaid eye on said spring and through said bushing, said pin being formed with a shoulder at the junction of the aforesaid head and cylindrical portion designed to receive the thrust of said spring in one direction, said bushing being so constructed and mounted as to receive the thrust of said spring in the opposite direction, clamping bolts mounted in and extending between the split parts of the ends of the aforesaid arms, and means adjustably mounted on the end of said pin which extends through said bushing designed for engagement with the structure which supports said pin to hold said pin against movement in a direction to withdraw its aforesaid end through said bushing.

5. In a mechanism for connecting one end of a spring to a frame member of a vehicle comprising a shackle mounted at the side of said frame member and journalled at one end upon a member supported by said frame member, said shackle comprising an arm extending closely adjacent said frame member and a second arm spaced outwardly from said first named arm, said first named arm being formed with a smooth cylindrical aperture and said second named arm being formed with a threaded cylindrical aperture in alignment with the aperture in said first named arm, a threaded bushing screwed into the aperture in said second named arm, an eye on said spring disposed intermediate the aforesaid arms, an axially adjustable pin connecting said shackle to said spring, said pin comprising a cylindrical head mounted in the aperture formed in said first named arm, and a reduced cylindrical portion extending through the aforesaid eye on said spring and through said bushing, said pin being formed with a shoulder at the junction of the aforesaid head and cylindrical portion designed to receive the thrust of said spring in one direction, and said bushing being so mounted and constructed as to receive the thrust of said spring in the opposite direction, and means for holding said pin against movement in a direction to withdraw its end through said bushing adjustably mounted on the portion of said pin which extends through said bushing.

HAROLD D. CHURCH.